United States Patent
Nakanishi et al.

(10) Patent No.: US 12,534,601 B2
(45) Date of Patent: Jan. 27, 2026

(54) RESIN COMPOSITION

(71) Applicant: Mitsubishi Chemical Corporation, Tokyo (JP)

(72) Inventors: Shinji Nakanishi, Tokyo (JP); Eri Sawano, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 809 days.

(21) Appl. No.: 17/579,009

(22) Filed: Jan. 19, 2022

(65) Prior Publication Data

US 2022/0135778 A1 May 5, 2022

Related U.S. Application Data

(63) Continuation of application No. PCT/JP2020/030360, filed on Aug. 7, 2020.

(30) Foreign Application Priority Data

Aug. 9, 2019 (JP) ................................. 2019-147754

(51) Int. Cl.
*C08L 23/06* (2006.01)

(52) U.S. Cl.
CPC .......... *C08L 23/06* (2013.01); *C08L 2205/025* (2013.01); *C08L 2205/03* (2013.01); *C08L 2207/062* (2013.01); *C08L 2207/066* (2013.01)

(58) Field of Classification Search
CPC ............... C08L 23/06; C08L 2205/025; C08L 2205/035; C08L 29/04; C08L 31/04
See application file for complete search history.

(56) References Cited

U.S. PATENT DOCUMENTS

| | | | |
|---|---|---|---|
| 6,398,059 B1 * | 6/2002 | Hayashi ................. | C08L 77/02 220/62.22 |
| 2014/0079935 A1 * | 3/2014 | Broyles ............... | C08L 23/0869 524/53 |
| 2017/0087812 A1 * | 3/2017 | Hirose ................ | C08L 23/0861 |
| 2018/0051169 A1 | 2/2018 | Komuro et al. | |
| 2019/0184625 A1 * | 6/2019 | Katsuno ............... | B32B 27/302 |

FOREIGN PATENT DOCUMENTS

| | | |
|---|---|---|
| EP | 2194093 A1 | 6/2010 |
| EP | 2275481 A2 | 1/2011 |
| EP | 2554373 A1 | 2/2013 |
| EP | 3121230 A1 | 1/2017 |
| JP | H5-032831 | 2/1993 |
| JP | H9-278952 | 10/1997 |
| JP | H11-293068 | 10/1999 |
| JP | 2001-200124 | 7/2001 |
| JP | 2003-192016 | 7/2003 |
| JP | 2003-226787 | 8/2003 |
| JP | 2005-23260 A | 1/2005 |
| JP | 2005-181556 A | 7/2005 |
| JP | 2009-161703 A | 7/2009 |
| JP | 2011-225688 A | 11/2011 |
| JP | 2014-15569 A | 1/2014 |
| JP | 2014-104729 | 6/2014 |
| JP | 2014-200968 | 10/2014 |
| JP | 2014-213903 | 11/2014 |
| JP | 2016-204572 A | 12/2016 |
| JP | 2019-099717 | 6/2019 |
| WO | WO 90/14227 A1 | 11/1990 |

OTHER PUBLICATIONS

Office Action for JP App. No. 2021-539268, dated Jan. 9, 2024 (w/ translation).
Decision of Refusal dated Jul. 2, 2024, issued in Japanese patent application No. 2021-539268, with English machine translation thereof.
Supplementary ESR for EP App. No. 20852265.6, dated Aug. 17, 2022.
Office Action for CN App. No. 202080050937.3, dated Aug. 10, 2023 (w/ translation).
ISR for PCT/JP2020/030360, dated Oct. 27, 2020.
IPRP for PCT/JP2020/030360, dated Feb. 17, 2022 (translation only).
Office Action for CN App. No. 202080050937.3, dated Jan. 19, 2023 (w/ translation).
Office Action for CN App. No. 202080050937.3, dated Jan. 30, 2024 (w/ translation).
Notice of Appeal dated Dec. 16, 2024, issued in Chinese patent application No. 202080050937.3, with English machine translation.
Decision on Appeal against Decision of Refusal, mailed Apr. 28, 2025, issued in Chinese patent application No. 202080050937.3, with partial English machine translation thereof.

* cited by examiner

*Primary Examiner* — Robert C Boyle
(74) *Attorney, Agent, or Firm* — Greenblum & Bernstein, P.L.C.

(57) ABSTRACT

A resin composition that contains: (A) a bio-polyethylene resin; (B) an ethylene-vinyl alcohol copolymer having an ethylene content of 20 to 60 mol %; and (C) at least one component selected from the group consisting of an ethylene-vinyl acetate copolymer, an acid-modified ethylene-α-olefin copolymer, an ethylene-unsaturated monocarboxylic acid copolymer, an ionomer of the ethylene-unsaturated monocarboxylic acid copolymer, an ethylene-vinyl alcohol copolymer having an ethylene content of 70 to 90 mol %, and a hydrotalcite compound. The resin composition employs a bio-polyethylene resin and yet can suppress gumming and provide a formed product having an excellent appearance.

3 Claims, No Drawings

RESIN COMPOSITION

RELATED APPLICATIONS

This application is a continuation of International Application No. PCT/JP2020/030360, filed on Aug. 7, 2020, which claims priority to Japanese Patent Application No. 2019-147754, filed on Aug. 9, 2019, the entire contents of each of which being herein incorporated by reference.

TECHNICAL FIELD

The present disclosure relates to a resin composition and, more specifically, to a resin composition which employs a bio-polyethylene resin and yet can suppress gumming and provide a formed product having excellent appearance.

BACKGROUND ART

Conventionally, ethylene-vinyl alcohol copolymers are mainly used for food packaging materials because of their excellent gas barrier properties and transparency. Sheets, films, and the like to be used as the food packaging materials can be made of such an ethylene-vinyl alcohol copolymer alone, but are generally laminated with a polyolefin resin or the like with the intervention of an adhesive agent layer so as to be imparted with water resistance, strength, and other functions for use as a multilayer structure.

Further, scraps such as wastes, cutoff pieces, unnecessary portions, and defectives occurring when products such as containers are formed from the multilayer structure, and refuse occurring after the use of the formed products are recovered, and melt-formed into a recycled material, which is in turn formed into a recycled layer (hereinafter sometimes referred to as "regrind layer") for reuse as at least one layer of a multilayer structure. Where the recycled material is used, it is necessary to prevent the discoloration of a formed product, and to suppress gumming occurring due to a decomposition product of the ethylene-vinyl alcohol copolymer in order to impart the formed product with excellent appearance.

In recent years, it is contemplated to use a resin derived from a biomass resource such as plant instead of a petroleum-derived resin as a part of the resin to be used for the multilayer structure in order to reduce an environmental load (see, for example, PTL 1 to PTL 3).

RELATED ART DOCUMENTS

Patent Documents

PTL 1: JP-A-2014-200968
PTL 2: JP-A-2014-104729
PTL 3: JP-A-2014-213903

SUMMARY

Where a resin composition containing the ethylene-vinyl alcohol copolymer and a polyethylene resin derived from a biomass resource is melt-formed, however, the biomass-derived polyethylene resin is liable to be separated from the resin composition to produce gummy matter, because the biomass-derived polyethylene resin contains a greater amount of a low molecular weight component than the petroleum-derived polyethylene resin. As the proportion of the biomass-derived polyethylene resin increases, the discoloration and the gumming due to the polyethylene resin are more liable to occur, thereby deteriorating the appearance. Therefore, further improvement is required.

In view of this, the present disclosure provides a resin composition which employs the biomass-derived polyethylene resin and yet can suppress the gumming occurring due to the polyethylene resin during the forming of the resin composition and suppress the discoloration and other appearance deterioration of a formed product.

In view of the foregoing, the inventors of the present disclosure conducted intensive studies and, as a result, found that, where a specific component (C) is blended in a base polymer containing a bio-polyethylene resin (A) and an ethylene-vinyl alcohol copolymer (B) having an ethylene content of 20 to 60 mol %, the aforementioned problems can be solved.

According to the present disclosure, there is provided a resin composition containing: (A) a bio-polyethylene resin; (B) an ethylene-vinyl alcohol copolymer having an ethylene content of 20 to 60 mol %; and (C) at least one component selected from the group consisting of an ethylene-vinyl acetate copolymer, an acid-modified ethylene-α-olefin copolymer, an ethylene-unsaturated monocarboxylic acid copolymer, an ionomer of the ethylene-unsaturated monocarboxylic acid copolymer, an ethylene-vinyl alcohol copolymer having an ethylene content of 70 to 90 mol %, and a hydrotalcite compound.

The resin composition of the present disclosure contains the bio-polyethylene resin (A), the ethylene-vinyl alcohol copolymer (B) having an ethylene content of 20 to 60 mol %, and at least one component (C) selected from the group consisting of the ethylene-vinyl acetate copolymer, the acid-modified ethylene-α-olefin copolymer, the ethylene-unsaturated monocarboxylic acid copolymer, the ionomer of the ethylene-unsaturated monocarboxylic acid copolymer, the ethylene-vinyl alcohol copolymer having an ethylene content of 70 to 90 mol %, and the hydrotalcite compound. Therefore, the resin composition of the present disclosure can suppress the gumming occurring due to the bio-polyethylene resin during the forming, and suppress the discoloration and other appearance deterioration of the formed product.

Where the component (C) is present in a proportion of 0.1 to 30 parts by weight based on 100 parts by weight of the total of the bio-polyethylene resin (A) and the ethylene-vinyl alcohol copolymer (B) having an ethylene content of 20 to 60 mol %, it is possible to further suppress the gumming occurring due to the bio-polyethylene resin during the forming, and to further suppress the discoloration and other appearance deterioration of the formed product.

Where the bio-polyethylene resin (A) and the ethylene-vinyl alcohol copolymer (B) having an ethylene content of 20 to 60 mol % are present in a weight ratio (A)/(B) of 0.1/99.9 to 99.9/0.1, it is possible to improve the formability in the forming, and the barrier properties of the formed product.

DESCRIPTION OF EMBODIMENTS

Embodiments of the present disclosure will hereinafter be described specifically. It should be understood that the disclosure be not limited to these embodiments.

The ethylene-vinyl alcohol copolymer having an ethylene content of 20 to 60 mol % is sometimes referred to as "EVOH" in the present disclosure.

The resin composition of the present disclosure is prepared by blending the specific component (C) in a base polymer including the bio-polyethylene resin (A) and the EVOH (B). The respective components will hereinafter be described.

[Bio-Polyethylene Resin (A)]

The term "bio-polyethylene resin" means a polyethylene resin chemically or biologically synthesized by using a renewable biomass resource as a material. The bio-polyethylene resin has a feature such that, even if it is incinerated, it does not increase the concentration of carbon dioxide in the atmosphere because of the carbon neutral property of the biomass.

The bio-polyethylene resin (A) is preferably prepared by using a plant-derived ethylene prepared from bioethanol obtained from a plant raw material. That is, the bio-polyethylene resin (A) is preferably a plant-derived polyethylene resin.

There is no difference between the polyethylene resin derived from plant (biomass resource) and a polyethylene resin derived from petroleum in molecular weight, mechanical properties, thermal properties, and the like. In general, these resins are distinguished from each other based on a biomass degree. Since the carbon of the petroleum-derived polyethylene resin does not contain $^{14}C$ (radioactive carbon 14 having a half-life of 5730 years), the biomass degree is determined by measuring the concentration of $^{14}C$ by an accelerator mass spectrometry, serving as an index indicating the percentage of the plant-derived bio-polyethylene resin. When the biomass degree of a film formed by using the plant-derived polyethylene resin is measured, therefore, the biomass degree corresponds to the percentage of the plant-derived polyethylene resin. That is, the bio-polyethylene resin (A) contains radioactive carbon ($^{14}C$).

The biomass degree can be measured, for example, by the following method. A measurement sample is burned, and carbon dioxide generated from the measurement sample is purified through a vacuum line and reduced with hydrogen in the presence of an iron catalyst to generate graphite. Then, the graphite is attached to a dedicated $^{14}C$-AMS device (available from NEC Corporation) based on a tandem accelerator. Then, $^{14}C$ is counted, and the concentration of $^{13}C$ ($^{13}C/^{12}C$) and the concentration of $^{14}C$ ($^{14}C/^{12}C$) are measured. Based on these measurement values, the percentage of the $^{14}C$ concentration of the sample with respect to the standard modern carbon is calculated.

Examples of the bio-polyethylene resin (A) include polyethylene homopolymer and polyethylene copolymer obtained by polymerizing ethylene derived from bioethanol. The polyethylene copolymer is a copolymer of ethylene and a small amount of a comonomer. The polyethylene copolymer may be, for example, a copolymer of ethylene and some other α-olefin monomer present in a weight fraction of less than 50%, or a functional group-containing non-olefin monomer present in a weight fraction of not greater than 3%.

Examples of the other α-olefin include C3 to C20 α-olefins such as propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. These may be used alone or in combination.

Examples of the non-olefin monomer include styrene monomer, diene monomer, cyclic monomer, and oxygen atom-containing monomer. These may be used alone or in combination.

Examples of the styrene monomer include styrene, 4-methylstyrene, and 4-dimethylaminostyrene.

Examples of the diene monomer include 1,3-butadiene, 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, and dicyclooctadiene.

Examples of the cyclic monomer include methylene norbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,2-norbornadiene, and cyclopentene.

Examples of the oxygen atom-containing monomer include hexenol, hexenoic acid, and methyl octenoate.

The other α-olefin and the non-olefin monomer may be those that are prepared by using a renewable biomass resource as a material, or may be those that are prepared by using petroleum as a material. Where the renewable biomass resource is used as the material, the biomass degree of the final product can be further increased. Where the petroleum is used as the material, various types of α-olefins and non-olefin monomers are available, so that the physical properties and the like of the polyethylene resin can be easily controlled by using them for the production.

The bio-polyethylene resin (A) is prepared by homopolymerization of ethylene, or by copolymerization of ethylene and the comonomer. The polymerization or the copolymerization is allowed to proceed by an ordinary method with the use of a metallocene catalyst or a Ziegler-Natta catalyst. It is particularly preferred to use the metallocene catalyst.

Specific examples of the bio-polyethylene resin (A) include high-density polyethylene (HDPE, having a density of not less than 0.940 g/cm$^3$), medium-density polyethylene (MDPE, having a density of not less than 0.925 and less than 0.940 g/cm$^3$), low-density polyethylene (LDPE, having a density of less than 0.925 g/cm$^3$), and linear low-density polyethylene (LLDPE, having a density of 0.910 to 0.925 g/cm$^3$). These may be used alone or in combination. Of these, the high-density polyethylene and the linear low-density polyethylene are preferred.

The bio-polyethylene resin (A) typically has a melt flow rate (MFR) of 0.1 to 50 g/10 minutes, preferably 0.5 to 30 g/10 minutes, particularly preferably 2 to 10 g/10 minutes (as measured at 190° C. with a load of 2160 g).

If the MFR is excessively great, the film formability tends to be unstable. If the MFR is excessively small, the viscosity tends to be excessively high, making the melt extrusion difficult.

A preferred example of a commercially available product of the bio-polyethylene resin (A) to be used in the present disclosure is Green PE available from Braskem S. A.

The bio-polyethylene resins described above may be used alone or in combination as the bio-polyethylene resin (A).

[EVOH (B)]

The EVOH (B) is a resin typically prepared by saponifying an ethylene-vinyl ester copolymer which is a copolymer of ethylene and a vinyl ester monomer, and is a water-insoluble thermoplastic resin. As the vinyl ester monomer, vinyl acetate is generally used from the viewpoint of economy.

A known polymerization method such as solution polymerization method, suspension polymerization method or emulsion polymerization method may be utilized for polymerization of ethylene and the vinyl ester monomer. In general, a solution polymerization method using methanol as a solvent is utilized. The saponification of the resulting ethylene-vinyl ester copolymer may be achieved by a known method.

The EVOH (B) thus prepared mainly contains an ethylene structural unit and a vinyl alcohol structural unit, and generally further contains a small amount of a vinyl ester structural unit left unsaponified.

Vinyl acetate is typically used as the vinyl ester monomer, because it is easily commercially available and ensures a higher impurity treatment efficiency in the preparation. Other examples of the vinyl ester monomer include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, and aromatic vinyl esters such as vinyl benzoate. The aliphatic vinyl esters typically have a carbon number of 3 to 20, preferably 4 to 10, particularly preferably 4 to 7. These vinyl esters may be used alone or in combination.

The ethylene content of the EVOH (B) can be controlled by adjusting the pressure of ethylene to be supplied when the vinyl ester monomer and ethylene are copolymerized. The ethylene content of the EVOH (B) is typically 20 to 60 mol %, preferably 25 to 50 mol %, particularly preferably 25 to 35 mol %. If the ethylene content is excessively low, the high-humidity gas barrier property and the melt formability tend to be deteriorated. If the ethylene content is excessively high, on the other hand, the gas barrier property tends to be deteriorated.

The ethylene content can be measured based on ISO 14663.

The vinyl ester saponification degree of the EVOH (B) can be controlled by adjusting the amount of a saponification catalyst (typically, an alkaline catalyst such as sodium hydroxide), a saponification temperature, a saponification period, and the like for the saponification of the ethylene-vinyl ester copolymer. The saponification degree is typically 90 to 100 mol %, preferably 95 to 100 mol %, particularly preferably 99 to 100 mol %. If the saponification degree is excessively low, the gas barrier property, the heat stability, the humidity resistance, and the like tend to be deteriorated.

The saponification degree of the EVOH may be measured based on JIS K6726 (with the use of a solution obtained by homogenously dissolving the EVOH in a water/methanol solvent).

The EVOH typically has a melt flow rate (MFR) of 0.5 to 100 g/10 minutes, preferably 1 to 50 g/10 minutes, particularly preferably 3 to 35 g/10 minutes (as measured at 210° C. with a load of 2160 g). If the MFR of the EVOH is excessively high, the film formability tends to be unstable. If the MFR of the EVOH is excessively low, the viscosity tends to be excessively increased, making the melt extrusion difficult.

The MFR, which is an index of the polymerization degree of the EVOH, can be controlled by adjusting the amount of a polymerization initiator and the amount of the solvent in the copolymerization of ethylene and the vinyl ester monomer.

The EVOH may further contain a structural unit derived from any of the following comonomers in an amount (e.g., not greater than 10 mol % of the EVOH) that does not impair the effects of the present disclosure.

The comonomers include: olefins such as propylene, 1-butene, and isobutene, hydroxyl-containing α-olefins such as 3-buten-1-ol, 3-butene-1,2-diol, 4-penten-1-ol, and 5-hexene-1,2-diol, and derivatives including esterification products and acylation products of these hydroxyl-containing α-olefins; hydroxyalkyl vinylidenes such as 2-methylenepropane-1,3-diol and 3-methylenepentane-1,5-diol; hydroxyalkyl vinylidene diacetates such as 1,3-diacetoxy-2-methylenepropane, 1,3-dipropionyloxy-2-methylenepropane, and 1,3-dibutyryloxy-2-methylenepropane; unsaturated acids such as acrylic acid, methacrylic acid, crotonic acid, phthalic acid (anhydride), maleic acid (anhydride), and itaconic acid (anhydride), salts of these unsaturated acids, and monoalkyl and dialkyl esters of these unsaturated acids each including a C1 to C18 alkyl group; acrylamide compounds such as acrylamide, N-alkylacrylamides each including a C1 to C18 alkyl group, N,N-dimethylacrylamide, 2-acrylamidopropane sulfonic acid and its salts, and acrylamidopropyldimethylamine and its acid salts and quaternary salts; methacrylamide compounds such as methacrylamide, N-alkylmethacrylamides each including a C1 to C18 alkyl group, N,N-dimethylmethacrylamide, 2-methacrylamidopropane sulfonic acid and its salts, and methacrylamidopropyldimethylamine and its acid salts and quaternary salts; N-vinylamides such as N-vinylpyrrolidone, N-vinylformamide, and N-vinylacetamide; vinyl cyanates such as acrylonitrile and methacrylonitrile; vinyl ethers such as alkyl vinyl ethers each including a C1 to C18 alkyl group, hydroxyalkyl vinyl ethers, and alkoxyalkyl vinyl ethers; halogenated vinyl compounds such as vinyl chloride, vinylidene chloride, vinyl fluoride, vinylidene fluoride, and vinyl bromide; vinylsilanes such as trimethoxyvinylsilane; allyl acetate, and halogenated allyl compounds such as allyl chloride; allyl alcohol compounds such as allyl alcohol and dimethoxyallyl alcohol; and trimethyl(3-acrylamido-3-dimethylpropyl)ammonium chloride and acrylamido-2-methylpropane sulfonic acid. These may be used alone or in combination.

In particular, an EVOH having a primary hydroxyl group in its side chain is preferred because it is possible to improve the secondary formability while ensuring the gas barrier properties. An EVOH obtained by copolymerization with the hydroxyl-containing α-olefin is particularly preferred, and an EVOH having a 1,2-diol structure in its side chain is especially preferred.

In particular, where the EVOH having a primary hydroxyl group in its side chain is used, the content of a structural unit derived from a monomer having the primary hydroxyl group is typically 0.1 to 20 mol %, preferably 0.5 to 15 mol %, particularly preferably 1 to 10 mol % of the EVOH.

The EVOH (B) to be used in the present disclosure may be a post-modified EVOH such as a urethanized, acetalized, cyanoethylated or oxyalkylenated EVOH.

The EVOH (B) to be used in the present disclosure may be a mixture of two or more EVOHs. These EVOHs may, for example, have different saponification degrees, different polymerization degrees, and different comonomer components.

In the resin composition of the present disclosure, the bio-polyethylene resin (A) and the EVOH (B) are preferably present in a blending weight ratio (A)/(B) of 0.1/99.9 to 99.9/0.1, more preferably 20/80 to 99/1, particularly preferably 25/75 to 95/5. If the blending ratio of the bio-polyethylene resin (A) is excessively small, the moldability at a low temperature tends to be deteriorated. If the blending ratio of the bio-polyethylene resin (A) is excessively great, the barrier properties tend to be deteriorated.

The base polymer in the resin composition of the present disclosure includes the bio-polyethylene resin (A) and the EVOH (B). In the resin composition, the base polymer is typically present in a proportion of not less than 60 wt. %, preferably not less than 70 wt. %, particularly preferably not less than 80 wt. %. The upper limit of the proportion of the base polymer is typically 99.9 wt. %.

The specific component (C) is blended in the base polymer, thereby making it possible to suppress the gumming occurring due to the bio-polyethylene resin during the forming and to suppress the discoloration and other appearance deterioration of the formed product. Further, when the resin composition is pelletized, the bulk density can be increased by blending the component (C). Therefore, the pellets can be densely packed in a bag or the like.

In the present disclosure, the proportion of the component (C) is preferably 0.1 to 30 parts by weight based on 100 parts by weight of the total of the bio-polyethylene resin (A) and the EVOH (B). Where the proportion of the component (C) falls within the aforementioned range, it is possible to suppress the discoloration of the formed product, and the appearance deterioration of the formed product occurring due to the gumming attributable to the bio-polyethylene resin during the forming. Further, when the resin composition is pelletized, the bulk density can be increased. The proportion of the component (C) is more preferably 0.2 to 20 parts by weight, particularly preferably 0.5 to 10 parts by weight, based on 100 parts by weight of the total of the bio-polyethylene resin (A) and the EVOH (B). When two or more of the components are contained as the component (C) in the resin composition, the proportion of the component (C) is the total proportion of the components.

The specific component (C) is at least one selected from the group consisting of the ethylene-vinyl acetate copolymer, the acid-modified ethylene-α-olefin copolymer, the ethylene-unsaturated monocarboxylic acid copolymer, the ionomer of the ethylene-unsaturated monocarboxylic acid copolymer, the ethylene-vinyl alcohol copolymer having an ethylene content of 70 to 90 mol %, and the hydrotalcite compound. The component (C) will hereinafter be described.

[Ethylene-Vinyl Acetate Copolymer]

The ethylene-vinyl acetate copolymer (hereinafter sometimes referred to as "EVA") is a polymer obtained by copolymerizing ethylene and vinyl acetate. The EVA may be a modified EVA as required.

The vinyl acetate content of the EVA is typically 1 to 60 mol %, preferably 5 to 50 mol %, particularly preferably 10 to 40 mol %. If the vinyl acetate content is excessively small, the suppression of the gumming and the improvement of the appearance of the formed product tend to be insufficient. If the vinyl acetate content is excessively great, the EVA is liable to be decomposed at a lower decomposition temperature to generate acetic acid, thereby damaging the machine. Further, the resin composition tends to be poorer in heat stability.

The EVA typically has a melt flow rate (MFR) of 0.1 g to 100 g/10 minutes, preferably 0.5 to 50 g/10 minutes, particularly preferably 1 to 30 g/10 minutes (as measured at 190° C. with a load of 2160 g). If the MFR of the EVA falls outside the aforementioned range, the compatibility with the base polymer tends to be reduced, thereby reducing the dispersibility during mixing.

The EVA may be a modified carboxyl-containing EVA obtained by chemically bonding an unsaturated carboxylic acid or its anhydride to the EVA through an addition reaction or a graft reaction, as long as the effects of the present disclosure are not impaired. Specifically, the modification degree is preferably not greater than 10 mol %, for example. Examples of the unsaturated carboxylic acid and its anhydride include ethylenically unsaturated monocarboxylic acids such as acrylic acid, methacrylic acid, ethacrylic acid, and crotonic acid, and ethylenically unsaturated dicarboxylic acids, and anhydrides and half esters thereof such as fumaric acid, itaconic acid, citraconic acid, maleic acid, monomethyl maleate, and monoethyl maleate. Of these, maleic anhydride is preferred.

The proportion of the EVA is preferably 0.1 to 30 parts by weight, more preferably 0.5 to 20 parts by weight, particularly preferably 1 to 10 parts by weight, based on 100 parts by weight of the total of the bio-polyethylene resin (A) and the EVOH (B). Where the proportion of the EVA falls within the aforementioned range, it is possible to suppress the gumming occurring due to the bio-polyethylene resin during the forming and to suppress the discoloration and other appearance deterioration of the formed product. The EVA may be used alone, or two or more EVAs having different ethylene contents, different molecular weights, different MFRs, different densities, different modification groups, and different modification degrees may be used in combination.

[Acid-Modified Ethylene-α-Olefin Copolymer]

The acid-modified ethylene-α-olefin copolymer is obtained by copolymerizing monomers for the ethylene-α-olefin copolymer with parts of the monomers replaced with an α,β-unsaturated carboxylic acid or its anhydride, or by introducing an α,β-unsaturated carboxylic acid or its anhydride into some of side chains of the ethylene-α-olefin copolymer by a graft reaction such as radical addition reaction. However, the acid-modified ethylene-α-olefin copolymer described above excludes an ethylene-unsaturated monocarboxylic acid copolymer to be described later.

Examples of the ethylene-α-olefin copolymer include copolymers of ethylene and C3 to C20 (preferably C3 to C10) α-olefins. Specific examples of the ethylene-α-olefin copolymer include ethylene-propylene copolymer, ethylene-1-butene copolymer, ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer, and ethylene-1-butene-1-octene copolymer. The ethylene-1-butene copolymer, the ethylene-1-hexene copolymer, the ethylene-1-octene copolymer, the ethylene-1-butene-1-hexene copolymer, and the ethylene-1-butene-1-octene copolymer are preferred, and the ethylene-1-butene copolymer is more preferred.

Examples of the α,β-unsaturated carboxylic acid and its anhydride to be used for the acid modification include ethylenically unsaturated monocarboxylic acids such as acrylic acid, methacrylic acid, ethacrylic acid, and crotonic acid, and ethylenically unsaturated dicarboxylic acids, and anhydrides and half esters thereof such as fumaric acid, itaconic acid, citraconic acid, maleic acid, monomethyl maleate, and monoethyl maleate. These α,β-unsaturated carboxylic acids, and the anhydrides and the half esters thereof may be used alone or in combination. Of these, maleic anhydride is preferred.

The acid-modified ethylene-α-olefin copolymer typically has an acid value of not greater than 50 mg KOH/g, preferably not greater than 30 mg KOH/g, particularly preferably not greater than 20 mg KOH/g. If the acid value is excessively high, the number of reaction sites for reaction with hydroxyl groups in the EVOH (B) tends to be increased and, therefore, a polymerization product having a higher polymerization degree is liable to be generated during a melt-kneading process. This tends to reduce the extrusion stability, making it difficult to provide a properly formed product. The lower limit of the acid value is typically 1 mg KOH/g, preferably 2 mg KOH/g. The acid value is measured based on JIS K0070.

The acid-modified ethylene-α-olefin copolymer typically has a melt flow rate (MFR) of 0.01 to 150 g/10 minutes, preferably 0.1 to 50 g/10 minutes, more preferably 1 to 25 g/10 minutes, still more preferably 1.5 g to 10 g/10 minutes (as measured at 230° C. with a load of 2160 g).

The maleic anhydride-modified ethylene-α-olefin copolymer typically has a MFR of 0.1 to 150 g/10 minutes, preferably 0.5 to 100 g/10 minutes, more preferably 1 to 50 g/10 minutes, still more preferably 5 g to 35 g/10 minutes (as measured at 230° C. with a load of 2160 g).

If the MFR falls outside the aforementioned range, the compatibility with the base polymer tends to be reduced, thereby reducing the dispersibility during the mixing.

The acid-modified ethylene-α-olefin copolymer typically has a density of not greater than 0.9 g/cm$^3$, preferably not greater than 0.89 g/cm$^3$, particularly preferably not greater than 0.88 g/cm$^3$. The lower limit of the density of the acid-modified ethylene-α-olefin copolymer is typically 0.85 g/cm$^3$.

The proportion of the acid-modified ethylene-α-olefin copolymer is preferably 0.1 to 30 parts by weight, more preferably 0.5 to 20 parts by weight, particularly preferably 1 to 10 parts by weight, based on 100 parts by weight of the total of the bio-polyethylene resin (A) and the EVOH (B). Where the proportion of the acid-modified ethylene-α-olefin copolymer falls within the aforementioned range, it is possible to suppress the gumming occurring due to the bio-polyethylene resin during the forming, and to suppress the discoloration and other appearance deterioration of the formed product. The acid-modified ethylene-α-olefin copolymers described above may be used alone or in combination.

[Ethylene-Unsaturated Monocarboxylic Acid Copolymer, and Ionomer of Ethylene-Unsaturated Monocarboxylic Acid Copolymer]

The ethylene-unsaturated monocarboxylic acid copolymer is obtained by copolymerizing a copolymerization component including ethylene and an unsaturated monocarboxylic acid compound.

Examples of the unsaturated monocarboxylic acid compound include unsaturated monocarboxylic acids such as acrylic acid and methacrylic acid, and unsaturated monocarboxylic acid esters such as methyl acrylate, ethyl acrylate, isobutyl acrylate, n-butyl acrylate, methyl methacrylate, and isobutyl methacrylate. These may be used alone or in combination. Of these, methacrylic acid and methyl methacrylate are preferred, and methyl methacrylate is particularly preferred, because the discoloration of the resin composition during the forming and the gumming occurring due to the bio-polyethylene resin can be suppressed.

The unsaturated monocarboxylic acid content of the ethylene-unsaturated monocarboxylic acid copolymer is typically 1 to 30 wt. %, preferably 5 to 30 wt. %. The ethylene content of the ethylene-unsaturated monocarboxylic acid copolymer is typically 50 to 99 wt. %, preferably 60 to 95 wt. %.

In addition to ethylene and the unsaturated monocarboxylic acid, other polymerizable monomers may be contained in the aforementioned copolymerization component in a proportion that does not impair the effects of the present disclosure (e.g., not greater than 30 wt. % of the copolymerization component).

Examples of the other polymerizable monomers include unsaturated dicarboxylic acids such as maleic acid, itaconic acid, and phthalic acid, unsaturated dicarboxylic acid anhydrides such as maleic anhydride, itaconic anhydride, and phthalic anhydride, and vinyl esters such as vinyl acetate and vinyl propionate. These may be used alone or in combination.

The ethylene-unsaturated monocarboxylic acid copolymer typically has a melt flow rate (MFR) of 0.1 to 100 g/10 minutes, preferably 0.5 to 50 g/10 minutes, particularly preferably 1 to 30 g/10 minutes (as measured at 190° C. with a load of 2160 g). If the MFR falls outside the aforementioned range, the compatibility with the base polymer tends to be reduced, thereby reducing the dispersibility during the mixing.

The ionomer of the ethylene-unsaturated monocarboxylic acid copolymer is obtained by partly or entirely neutralizing the acid moiety (e.g., carboxyl group or the like) of the ethylene-unsaturated monocarboxylic acid copolymer with a metal ion.

Examples of the metal ion for the neutralization of the acid moiety such as the carboxyl group of the ethylene-unsaturated monocarboxylic acid copolymer include monovalent metal ions such as lithium, sodium, potassium, rubidium, and cesium, divalent metal ions such as calcium, magnesium, iron, and zinc, and trivalent metal ions such as iron and aluminum. Of these, the monovalent metal ions are preferred, and sodium ion is particularly preferred as the metal ion for the neutralization of the acid moiety from the viewpoint of elasticity and flexibility.

The metal cation content of the ionomer is typically 0.4 to 4 mol, preferably 0.6 to 2 mol, per 1 kg of the ionomer. The neutralization degree of the ionomer with the aforementioned metal ion is 15 to 80%, preferably 20 to 60% of the acid moiety of the ethylene-unsaturated carboxylic acid copolymer.

The ionomer typically has a melting point of 70° C. to 120° C., preferably 80° C. to 110° C., particularly preferably 85° C. to 95° C.

Further, the ionomer typically has a melt flow rate (MFR) of 0.05 to 100 g/10 minutes, preferably 0.1 to 50 g/10 minutes, more preferably 0.1 to 10 g/10 minutes (as measured at 190° C. with a load of 2160 g).

The ionomer is preferably an ionomer obtained by neutralizing an ethylene-methyl (meth)acrylate copolymer with a monovalent metal ion, particularly preferably an ionomer obtained by neutralizing an ethylene-methyl methacrylate copolymer with sodium ion.

The proportions of the ethylene-unsaturated monocarboxylic acid copolymer and the ionomer of the ethylene-unsaturated monocarboxylic acid copolymer are each preferably 0.1 to 30 parts by weight, more preferably 0.5 to 20 parts by weight, particularly preferably 1 to 10 parts by weight, based on 100 parts by weight of the total of the bio-polyethylene resin (A) and the EVOH (B). Where the proportion of the ethylene-unsaturated monocarboxylic acid copolymer or the ionomer of the ethylene-unsaturated monocarboxylic acid copolymer falls within the aforementioned range, it is possible to suppress the gumming occurring due to the bio-polyethylene resin during the forming and to suppress the discoloration and other appearance deterioration of the formed product. The ethylene-unsaturated monocarboxylic acid copolymers and the ionomers of the ethylene-unsaturated monocarboxylic acid copolymers described above may be used alone or in combination.

[Ethylene-Vinyl Alcohol Copolymer Having Ethylene Structural Unit Content of 70 to 90 mol %]

The ethylene-vinyl alcohol copolymer having an ethylene structural unit content of 70 to 90 mol % (hereinafter sometimes referred to as "EVA saponification product") is obtained by saponifying a vinyl acetate moiety of an ethylene-vinyl acetate copolymer having an ethylene content of 70 to 90 mol %, and is different from the EVA in terms of the saponification.

The ethylene-vinyl acetate copolymer is produced by any known polymerization method such as solution polymerization, suspension polymerization, and emulsion polymerization, and the saponification of the ethylene-vinyl acetate copolymer can be achieved by a known saponification method. The EVA saponification product may be a modified EVA saponification product as required.

The ethylene content of the EVA saponification product is 70 to 90 mol %, preferably 75 to 90 mol %, particularly preferably 80 to 90 mol %. If the ethylene content is excessively small, the effects of the present disclosure (the gumming suppressing effect and the like) tend to be insufficient The EVA saponification product typically has a saponification degree of not less than 20 mol %, preferably 60 to 100 mol %, particularly preferably 90 to 100 mol %. If the saponification degree is excessively low, the effects of the present disclosure (the gumming suppressing effect and the like) may be insufficient.

The EVA saponification product typically has a melt flow rate (MFR) of 0.5 to 100 g/10 minutes, preferably 1 to 50 g/10 minutes, particularly preferably 2 to 30 g/10 minutes (as measured at 190° C. with a load of 2160 g) in order to ensure excellent dispersibility and to provide the effects of the present disclosure.

The EVA saponification product may be a modification product obtained by chemically bonding an unsaturated carboxylic acid or its anhydride to the EVA saponification product through an addition reaction, a graft reaction or the like, as long as the effects of the present disclosure are not impaired. Specifically, the modification degree is preferably not greater than 10 mol %, for example. Examples of the unsaturated carboxylic acid and its anhydride include ethylenically unsaturated monocarboxylic acids such as acrylic acid, methacrylic acid, ethacrylic acid, and crotonic acid, and ethylenically unsaturated dicarboxylic acids, and anhydrides and half esters thereof such as fumaric acid, itaconic acid, citraconic acid, maleic acid, monomethyl maleate, monoethyl maleate, and maleic anhydride. Of these, maleic anhydride is preferred.

The proportion of the EVA saponification product is preferably 0.1 to 30 parts by weight, more preferably 0.5 to 20 parts by weight, particularly preferably 1 to 10 parts by weight, based on 100 parts by weight of the total of the bio-polyethylene resin (A) and the EVOH (B). Where the proportion of the EVA saponification product falls within the aforementioned range, it is possible to suppress the gumming occurring due to the bio-polyethylene resin during the forming and to suppress the discoloration and other appearance deterioration of the formed product. The EVA saponification product may be used alone, or EVA saponification products having different ethylene contents, different saponification degrees, different molecular weights, different MFRs, different densities, different modification groups, and different modification degrees may be used in combination.

[Hydrotalcite Compound]

The hydrotalcite compound is, for example, a compound represented by the following general formula (1):

$$M_x Al_y(OH)_{2x+3y-2z}(E)_z \cdot aH_2O \quad (1)$$

wherein M is Mg, Ca or Zn, E is $CO_3$ or $HPO_4$, x, y, and z are each a number greater than 0, and a is 0 or a positive number.

Specific examples of the compound represented by the above general formula (1) include $Mg_{4.5}Al_2(OH)_{13}CO_3 \cdot 3.5H_2O$, $Mg_5Al_2(OH)_{14}CO_3 \cdot 4H_2O$, $Mg_6Al_2(OH)_{16}CO_3 \cdot 4H_2O$, $Mg_8Al_2(OH)_{20}CO_3 \cdot 5H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, and $Zn_6Al_6(OH)_{16}CO_3 \cdot 4H_2O$. The compound is not limited to those described above, but other examples of the compound include a compound which is obtained by substituting some of the OH groups of $Mg_2Al(OH)_9 \cdot 3H_2O$ with $CO_3$ or $HPO_4$ and cannot be represented by a definite chemical formula, and a compound which is obtained by removing the crystal water (a=0) and yet can provide substantially the same effects. Particularly, a compound represented by the above general formula (1) wherein M is Mg and E is $CO_3$ is preferred, which ensures the forming stability and the effect of suppressing the gumming occurring due to phase separation.

A compound represented by the following general formula (2), for example, is also usable as the hydrotalcite compound.

$$[(M_1^{2+})_{y1}(M_2^{2+})_{y2}]_{1-x}M_x^{3+}(OH)_2 A^{n-}_{x/n} \cdot mH_2O \quad (2)$$

wherein $M_1^{2+}$ is at least one divalent metal selected from Mg, Ca, Sr, and Ba, $M_2^{2+}$ is at least one metal selected from Zn, Cd, Pb, and Sn, $M_x^{3+}$ is a trivalent metal, $A^{n-}$ is an n-valent anion, and x, y1, y2, and m are positive numbers which satisfy $0<x\leq0.5$, $0.5<y1<1$, $y1+y2=1$, and $0\leq m<2$.

In the above general formula (2), Mg and Ca are preferred as $M_1^{2+}$, and Zn and Cd are preferred as $M_2^{2+}$. Further, examples of $M_x^{3+}$ include Al, Bi, In, Sb, B, Ga, and Ti, which may be used alone or in combination, and Al is practical as $M_x^{3+}$. In the general formula (2), examples of $A^{n-}$ include $CO_3^{2-}$, $OH^-$, $HCO_3^-$, salicylate ion, citrate ion, tartrate ion, $NO_3^-$, $I^-$, $(OOC-COO)^{2-}$, $ClO^{4-}$, $CH_3COO^-$, $CO_3^{2-}$, $(OOCHC=CHCOO)^{2-}$, and $[Fe(CN)_6]^{4-}$, which may be used alone or in combination. Of these, $CO_3^{2-}$ and $OH^-$ are useful.

Specific examples of the compound represented by the above general formula (2) include $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$, $[Mg_{1/7}Ca_{3/7}Zn_{3/7}]_{0.7}Al_{0.3}(OH)_2(OOCHC=CHCOO)_{0.15} \cdot 0.41H_2O$, $[Mg_{6/7}Cd_{1/7}]_{0.7}Al_{0.3}(OH)_2(CH_3COO)_{0.3} \cdot 0.34H_2O$, $[Mg_{6/7}Pd_{2/7}]_{0.7}Al_{0.30}(OH)_2(CO_3)_{0.15} \cdot 0.52H_2O$, $[Mg_{0.74}Zn_{0.26}]_{0.68}Al_{0.32}(OH)_2(CO_3)_{0.16}$, $[Mg_{0.56}Zn_{0.44}]_{0.68}Al_{0.32}(OH)_2(CO_3)_{0.16} \cdot 0.2H_2O$, $[Mg_{0.81}Zn_{0.19}]_{0.74}Al_{0.26}(OH)_2(CO_3)_{0.13}$, $[Mg_{0.75}Zn_{0.25}]_{0.8}Al_{0.20}(OH)_2(CO_3)_{0.10} \cdot 0.16H_2O$, $[Mg_{0.71}Zn_{0.29}]_{0.7}Al_{0.30}(OH)_2(NO_3)_{0.30}$, $[Mg_{0.71}Zn_{0.29}]_{0.7}Al_{0.30}(OH)_2(OOCHC=CHCOO)_{0.15}$, and $[Mg_{0.14}Ca_{0.57}Zn_{0.28}]_{0.7}Al_{0.30}(OH)_{23} \cdot 0.25H_2O$. Of these, $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$, $[Mg_{6/7}Cd_{1/7}]_{0.7}Al_{0.3}(OH)_2(CH_3COO)_{0.3} \cdot 0.34H_2O$, $[Mg_{5/7}Pd_{2/7}]_{0.7}Al_{0.30}(OH)_2(CO_3)_{0.15} \cdot 0.52H_2O$, and the like are preferred.

The hydrotalcite compound typically has an average particle diameter of not greater than 10 μm, more preferably not greater than 5 μm, particularly preferably not greater than 1 μm. If the average particle diameter is excessively great, it tends to be impossible to sufficiently provide the effects of the present disclosure because of a smaller surface area. The term "average particle diameter" herein used means an average particle diameter value obtained through measurement by a laser diffraction/scattering method and a particle size distribution measurement method.

Of the aforementioned hydrotalcite compounds, the hydrotalcite compound represented by the above general formula (1) is preferred, and $Mg_6Al_2(OH)_{16}CO_3 \cdot 4H_2O$ is particularly preferred, because the forming stability, the discoloration suppressing effect, and the effect of suppressing the gumming occurring due to phase separation can be improved.

The proportion of the hydrotalcite compound is preferably 0.1 to 30 parts by weight, more preferably 0.5 to 20 parts by weight, particularly preferably 1 to 10 parts by weight, based on 100 parts by weight of the total of the bio-polyethylene resin (A) and the EVOH (B). Where the proportion of the hydrotalcite compound falls within the aforementioned range, it is possible to suppress the gumming occurring due to the bio-polyethylene resin during the forming and to suppress the discoloration and other appearance deterioration of the formed product. The hydrotalcite compounds described above may be used alone or in combination.

The resin composition of the present disclosure contains any of the aforementioned compounds blended as the component (C) in the base polymer (including the bio-polyethylene resin (A) and the EVOH (B)). Particularly, the EVA, the acid-modified ethylene-α-olefin copolymer, the EVA saponification product, and the hydrotalcite compound are preferred as the component (C), because the discoloration of the formed product and the appearance deterioration of the formed product caused by the gumming due to the bio-polyethylene resin during the forming can be suppressed and, when the resin composition is pelletized, the bulk density of the pellets can be increased. These compounds are preferably used in combination. For example, it is preferred to use the EVA, the EVA saponification product, and the hydrotalcite compound in combination, or to use the EVA and the EVA saponification product in combination. The combinational use suppresses the discoloration of the formed product and the appearance deterioration of the formed product caused by the gumming due to the bio-polyethylene resin during the forming, and increases the bulk density when the resin composition is pelletized.

[Other Components]

In addition to the components (A) to (C), the resin composition of the present disclosure may optionally contain a thermoplastic resin (e.g., a petroleum-derived polyethylene) and additives which are generally added to the thermoplastic resin, as long as the effects of the present disclosure are not impaired.

Examples of the additives include plasticizer (e.g., aliphatic polyhydric alcohol such as ethylene glycol, glycerin or hexanediol, or the like), oxygen absorber, heat stabilizer, light stabilizer, UV absorber, colorant, antistatic agent, surfactant (excluding a surfactant used as a lubricant), antibacterial agent, anti-blocking agent, and filler (e.g., inorganic filler or the like). These additives may be used alone or in combination.

[Production of Resin Composition]

The resin composition of the present disclosure contains the aforementioned components (A) to (C), and preferably contains the aforementioned components (A) to (C) and any of the aforementioned optional components alone. The bio-polyethylene resin (A) and the EVOH (B) may each be a material that has never been used for the forming (unregenerated material). However, it is preferred to use a material recycled from scrap of a multilayer structure having a layer containing the bio-polyethylene resin (A) and the EVOH (B).

In some cases, it is also possible to use multilayer structures once used as packaging materials. Multilayer structures generally used as packaging materials for foods and the like each include an adhesive resin layer and a regrind layer in addition to a layer made of the bio-polyethylene resin (A) and the EVOH (B). Therefore, the resin composition of the present disclosure may contain a material resulting from the adhesive resin layer and the regrind layer in an amount that does not impair the effects of the present disclosure (e.g., in an amount of not greater than 30 wt. % of the resin composition).

A method for producing the resin composition of the present disclosure will hereinafter be described, in which a material recycled from the multilayer structure including the layer made of the bio-polyethylene resin (A) and the EVOH (B) is used.

Wastes, cutoff pieces, and unnecessary portions (scraps) occurring when products of the multilayer structure are produced, and the multilayer structure recycled as refuse are generally pulverized. Then, as required, the particle diameter of the resulting pulverization product is properly adjusted with the use of a sieve or the like. The pulverization product is used as a material for the resin composition of the present disclosure.

For the pulverization of the recycled material, a known pulverizer may be used. The pulverization product typically has an apparent density of 0.25 to 0.85 g/mL, preferably 0.3 to 0.7 g/mL, particularly preferably 0.35 to 0.6 g/mL. If the apparent density is excessively small, the bio-polyethylene resin (A) tends to be poorly dispersed in the resin composition layer, and the resin composition layer of the formed product tends to be poorer in melt formability and mechanical properties. If the apparent density is excessively great, the regrind layer of the formed product tends to be poorer in melt formability because of improper feeding in the extruder. The apparent density is measured in conformity with a test method specified in "5.3 Apparent Density" of JIS K6891.

The apparent density can be controlled by properly adjusting the shape of the pulverization blade of the pulverizer, the rotation speed of the pulverization blade, the pulverization rate, the mesh of the sieve, and the like. The shape and the particle diameter of the pulverization product can be adjusted by a known method.

The resin composition of the present disclosure is produced by adding the component (C) to a material obtained by pulverizing the recycled material of the multilayer structure containing the bio-polyethylene resin (A) and the EVOH (B) (hereinafter referred to as "pulverized material"). An unregenerated bio-polyethylene resin (A) and an unregenerated EVOH (B) may be blended in the pulverized material from the viewpoint of productivity.

Known examples of the resin composition production method include dry blending method, melt kneading method, solution mixing method, and impregnation method.

An example of the dry blending method is a method (i) in which the pulverized material and the component (C) are dry-blended by means of a tumbler or the like. For the dry blending, the component (C) may be dry-blended as it is with the pulverized material, or pellets of a thermoplastic resin containing the component (C) may be preliminarily prepared and then dry-blended with the pulverized material.

Examples of the melt kneading method include a method (ii) in which the dry-blended product obtained by the method (i) is melt-kneaded, and a method (iii) in which the pulverized material is melted, and the component (C) is added to the resulting melt, followed by melt-kneading.

An example of the solution mixing method is a method (iv) including the steps of preparing a solution by using the pulverized material, blending the component (C) in the solution, solidifying and forming the resulting solution, separating the resulting solid from the solution, and drying the solid.

In the present disclosure, different methods may be selected from the aforementioned methods to be used in combination. Particularly, the melt kneading method is preferred, and the method (ii) is particularly preferred from the viewpoint of the productivity.

As described above, the resin composition of the present disclosure is not limited to the resin composition prepared by using the recycled material of the multilayer structure as its material, but the unregenerated bio-polyethylene resin (A) and the unregenerated EVOH (B) may be used as the material. Where the unregenerated materials are used, the resin composition may be prepared so as to have the formulation according to the present disclosure by a known method such as the dry blending method, the melt kneading method or the solution mixing method. The resin composition prepared in this manner is also encompassed as the resin composition of the present disclosure.

The resin composition of the present disclosure typically has a water content of 0.01 to 0.5 wt. %, preferably 0.02 to 0.35 wt. %, particularly preferably 0.05 to 0.3 wt. %.

In the present disclosure, the water content of the resin composition is measured and calculated by the following method.

The pre-drying weight (W1) of a sample of the resin composition is measured by an electronic balance. After the sample is dried at 150° C. for 5 hours in a hot air dryer, the sample is cooled in a desiccator for 30 minutes, and then the post-drying weight (W2) of the sample is measured. The water content of the resin composition is calculated from the following expression:

Water content (wt. %)=[($W1$−$W2$)/$W1$]×100

The resin composition of the present disclosure may be produced in any of various forms, e.g., in a pellet form or powdery form, for use as a forming material for various formed products. Particularly, the resin composition of the present disclosure is preferably provided as a melt forming material, because the effects of the present disclosure tend to be more efficiently provided.

Exemplary products to be formed from the resin composition of the present disclosure for practical applications include a single-layer film formed by using the resin composition of the present disclosure, and a multilayer structure including a layer formed by using the resin composition of the present disclosure.

[Multilayer Structure]

The multilayer structure described above includes a layer formed from the resin composition of the present disclosure. The layer formed from the resin composition of the present disclosure (hereinafter referred to as "resin composition layer") may be laminated with some other base material (hereinafter referred to as "base resin") containing a thermoplastic resin other than the resin composition of the present disclosure as a major component. Thus, the resin composition layer can be strengthened, and imparted with an additional function.

Examples of the base resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers, and ethylene-α-olefin (C4 to C20 α-olefin) copolymers, polypropylene resins such as polypropylenes and propylene-α-olefin (C4 to C20 α-olefin) copolymers, polybutenes, polypentenes, and polycycloolefin resins (polymers having a cycloolefin structure in a main chain and/or a side chain thereof); polyolefin resins in a broader sense including modified olefin resins such as unsaturated carboxyl-modified polyolefin resins obtained by graft-modifying any of the aforementioned polyolefin resins with an unsaturated carboxylic acid or an unsaturated carboxylic acid ester; and ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acrylic resins, polystyrene resins, vinyl ester resins, polyester elastomers, polyurethane elastomers, polystyrene elastomers, halogenated polyolefins such as chlorinated polyethylenes and chlorinated polypropylenes, and aromatic and aliphatic polyketones.

Of these, the polyamide resins, the polyolefin resins, the polyester resins, and the polystyrene resins are preferred, and the polyolefin resins such as the polyethylene resins, the polypropylene resins, the polycycloolefin resins, and the unsaturated carboxyl-modified polyolefin resins obtained by modifying these polyolefin resins are more preferred from the viewpoint of the economy and the productivity.

Where layers a (a1, a2, . . . ) formed from the resin composition of the present disclosure and base resin layers b (b1, b2, . . . ) are laminated together to produce a multilayer structure, the layered configuration of the multilayer structure may be any combination of these layers, e.g., a/b, b/a/b, a/b/a, a1/a2/b, a/b1/b2, b2/b1/a/b1/b2, b2/b1/a/b1/a/b1/b2, or the like. The multilayer structure may further include a recycled layer formed from a mixture obtained by re-melting cutoff pieces and defective products occurring during the production of the multilayer structure and containing the resin composition of the present disclosure and the base resin. The total number of the layers of the multilayer structure is typically 2 to 15, preferably 3 to 10. In the aforementioned layered configuration, as required, an adhesive resin layer containing an adhesive resin may be provided between the layers.

Known adhesive resins are usable as the adhesive resin. The adhesive resin may be properly selected according to the type of the thermoplastic resin to be used for the base resin layers b. A typical example of the adhesive resin is a carboxyl-containing modified polyolefin polymer prepared by chemically bonding an unsaturated carboxylic acid or its anhydride to a polyolefin resin by an addition reaction, a graft reaction or the like. Examples of the carboxyl-containing modified polyolefin polymer include polyethylenes graft-modified with maleic anhydride, polypropylenes graft-modified with maleic anhydride, ethylene-propylene (block and random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride, and polyolefin resins graft-modified with maleic anhydride. These adhesive resins may each be used alone, or two or more of these adhesive resins may be used as a mixture.

Where adhesive resin layers are provided between the resin composition layer and the base resin layers in the multilayer structure, the adhesive resin layers are located on opposite sides of the resin composition layer and, therefore, a highly hydrophobic adhesive resin is preferably used for the adhesive resin layers.

The base resin and the adhesive resin may each contain conventionally known plasticizer, filler, clay (montmorillonite or the like), colorant, antioxidant, antistatic agent, lubricant, nucleating agent, antiblocking agent, wax, and the like in amounts that do not impair the effects of the present disclosure (e.g., typically in amounts of not greater than 30 wt. %, preferably not greater than 10 wt. %, based on the overall weight of the resin).

The resin composition layer formed from the resin composition of the present disclosure and the base resin layer may be laminated together (optionally with the adhesive resin layer provided therebetween) by a known laminating method. Examples of the laminating method include: a method in which a film or a sheet of the resin composition of the present disclosure is laminated with the base resin by melt extrusion; a method in which the base resin layer is laminated with the resin composition of the present disclosure by melt extrusion; a method in which the resin composition and the base resin are coextruded; a method in which the resin composition layer and the base resin layer are dry-laminated together with the use of a known adhesive agent such as of organic titanium compound, isocyanate compound, polyester compound or polyurethane compound; and a method in which a solution of the resin composition is applied on the base resin layer, and a solvent is removed from the applied solution. Of these methods, the resin composition/base resin coextrusion method is preferred from the viewpoint of costs and environmental concerns.

The multilayer structure described above is further subjected to a (heat) stretching process as required. The stretching process may be a uniaxial stretching process or a biaxial stretching process. The biaxial stretching process may be a simultaneous stretching process or a sequential stretching process. Exemplary methods for the stretching process include roll stretching method, tenter stretching method, tubular stretching method, stretch blowing method, and vacuum pressure forming method each having a higher stretch ratio. A temperature for the stretching is close to the melting point of the multilayer structure, and is typically selected from a range of about 40° C. to about 170° C., preferably about 60° C. to about 160° C. If the stretching temperature is excessively low, the stretchability tends to be poorer. If the stretching temperature is excessively high, it tends to be difficult to ensure stable stretching.

The resulting multilayer structure may be further subjected to a heat setting process to ensure dimensional stability after the stretching. The heat setting process may be performed in a known manner. For example, the stretched film is typically heat-treated at 80° C. to 180° C., preferably 100° C. to 165° C., for about 2 to about 600 seconds, while being kept tense. Where the stretched multilayer film produced by using the resin composition of the present disclosure is used as a shrinkable film, the stretched film may be cold-set so as to be imparted with a heat-shrinkable property, for example, by applying cold air over the stretched film without performing the above heat setting process.

Further, a cup-shaped or tray-shaped multilayer container may be produced by using the multilayer structure of the present disclosure. In this case, a drawing process is typically employed. Specific examples of the drawing process include vacuum forming method, pressure forming method, vacuum pressure forming method, and plug-assisted vacuum pressure forming method. Where a tube-shaped or bottle-shaped multilayer container (laminate structure) is produced from a multilayer parison (a hollow tubular preform to be blown), a blow molding process is employed. Specific examples of the blow molding process include extrusion blow molding method (twin head type, mold shift type, parison shift type, rotary type, accumulator type, horizontal parison type, and the like), cold parison blow molding method, injection blow molding method, and biaxial stretching blow molding method (extrusion type cold parison biaxial stretching blow molding method, injection type cold parison biaxial stretching blow molding method, injection inline type biaxial stretching blow molding method, and the like). As required, the resulting multilayer structure may be subjected to heating process, cooling process, rolling process, printing process, dry laminating process, solution or melt coating process, bag forming process, deep drawing process, box forming process, tube forming process, splitting process, or the like.

The thickness of the multilayer structure (or the stretched multilayer structure) and the thicknesses of the resin composition layer, the base resin layer, and the adhesive resin layer of the multilayer structure vary depending upon the layered configuration, the type of the base resin, the type of the adhesive resin, and the use purpose, the package shape, the required physical properties, and the like of the multilayer structure. The thickness of the multilayer structure (or the stretched multilayer structure) is typically 10 to 5,000 µm, preferably 30 to 3,000 µm, particularly preferably 50 to 2,000 µm. The thickness of the resin composition layer is typically 1 to 500 µm, preferably 3 to 300 µm, particularly preferably 5 to 200 µm. The thickness of the base resin layer is typically 5 to 3,000 µm, preferably 10 to 2,000 µm, particularly preferably 20 to 1,000 µm. The thickness of the adhesive resin layer is typically 0.5 to 250 µm, preferably 1 to 150 µm, particularly preferably 3 to 100 µm.

The thickness ratio between the resin composition layer and the base resin layer of the multilayer structure (resin composition layer/base resin layer) (if these layers each include a plurality of layers, the thickness ratio between the thickest one of the resin composition layers and the thickest one of the base resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles, and other containers produced from the film, the sheet or the stretched film formed in the aforementioned manner are useful as packaging material containers for general foods, condiments such as mayonnaise and dressing, fermented foods such as miso, fat and oil such as salad oil, beverages, cosmetics, pharmaceutical products, and the like.

EXAMPLES

The embodiments of the present disclosure will hereinafter be described more specifically by way of examples thereof. It should be understood that the present disclosure be not limited to the following examples within the scope of the disclosure. In the following description, "parts" and "%" are based on weight, unless otherwise specified.

Prior to implementation of Examples, the following ingredients were prepared.

[Bio-Polyethylene Resin (A)]
(A-1): Plant-derived linear low-density polyethylene (SLH118 (Green PE available from Braskem S. A.) having a MFR of 1.0 g/10 minutes (as measured at 190° C. with a load of 2160 g))
(A-2): Plant-derived high-density polyethylene (SGM9450F (Green PE available from Braskem S. A.) having a MFR of 0.33 g/10 minutes (as measured at 190° C. with a load of 5000 g))
[EVOH (B)]
(B-1): Ethylene-vinyl alcohol copolymer (having an ethylene content of 29 mol % and a MFR of 4 g/10 minutes (as measured at 210° C. with a load of 2160 g))
[Component (C)]
[EVA]
(C-1): EVA-1 (ULTRATHENE 3B53A (available from Tosoh Corporation) having a vinyl acetate content of 25 mol % and a MFR of 5.3 g/10 minutes (as measured at 190° C. with a load of 2160 g))
(C-2): EVA-2 (Evaflex V5961 (available from Dow-Mitsui Polychemicals Co., Ltd.) having a vinyl acetate content of 9 mol % and a MFR of 1.7 g/10 minutes (as measured at 190° C. with a load of 2160 g))
(C-3): EVA-3 (Evaflex EV170 (available from Dow-Mitsui Polychemicals Co., Ltd.) having a vinyl acetate content of 33 mol % and a MFR of 1 g/10 minutes (as measured at 190° C. with a load of 2160 g))
[Acid-Modified Ethylene-α-Olefin Copolymer]
(C-4): Maleic anhydride-modified ethylene-α-olefin copolymer (acid-modified TOUPHMER MA8510 (available from Mitsui Chemicals, Inc.) having a MFR of 5.0 g/10 minutes (as measured at 230° C. with a load of 2160 g))
[Ethylene-Unsaturated Monocarboxylic Acid Copolymer and Ionomer of Ethylene-Unsaturated Monocarboxylic Acid Copolymer]
(C-5): Ethylene-methyl methacrylate copolymer (EMMA) (NUCREL NO903HC (available from Dow-Mitsui Polychemicals Co., Ltd.) having a methyl methacrylate content of 9%, a MFR of 3 g/10 minutes (as measured at 190° C. with a load of 2160 g), and an acid value of 59 mg KOH/g)
(C-6): Ionomer of ethylene-methyl methacrylate copolymer (HIMIRAN 1707 (available from Dow-Mitsui Polychemicals Co., Ltd.) having a methyl methacrylate content of 9% and a MFR of 3 g/10 minutes (as measured at 190° C. with a load of 2160 g))

[EVA Saponification Product]
(C-7): Ethylene-vinyl alcohol copolymer (MELTHENE H0051K (available from Tosoh Corporation) having an ethylene content of 89 mol %, a saponification degree of 99 mol %, and a MFR of 6.5 g/10 minutes (as measured at 190° C. with a load of 2160 g))
[Hydrotalcite Compound]
(C-8): Hydrotalcite (ZHT4A (available from Kyowa Chemical Industry Co. Ltd.))
[Other Ingredients]
(α-1): Petroleum-derived polyethylene (Novatec UF240 (available from Japan Polyethylene Corporation) having a MFR of 2.1 g/10 minutes (as measured at 190° C. with a load of 2160 g))
(α-2): Calcium Stearate (available from Nitto Chemical Industry Co., Ltd.)
(α-3): Hindered phenol antioxidant (Irganox 1010 (available from BASF))
(α-4): Polyethylene terephthalate (BK-6180C (available from Mitsubishi Chemical Corporation))
(α-5): Polybutylene succinate (BioPBS FZ91PM (available from Mitsubishi Chemical Corporation))
(α-6): Polystyrene (G9401 (available from PS Japan Corporation))

After the ingredients described above were mixed together according to Tables 1 to 4 by a dry blending method, the resulting mixture was fed at a rate of 25 kg/hour to a twin-screw kneader by means of a gravity feeder. Thus, resin compositions of Examples 1 to 24, Comparative Examples 1 to 12, and Reference Examples 1 and 2 were each prepared in a pellet form. The kneading conditions were as follows:

[Kneading Conditions]
Twin-screw extruder: Having a diameter of 32 mm, and an L/D ratio of 56 (available from Japan Steel Works Co., Ltd.)
Extruder setting temperatures: C2/C3/C4/C5/C6/C7/C8/C9/C10/C11/C12/C13/C14/C15/C16/D=90/90/110/150/220/220/220/220/220/220/220/220/220/220/220/220° C.
Screw rotation speed: 270 ppm
Extrusion rate: 20 kg/hour
Strand cooling: Water cooling distance of 30 cm
Take-up speed: 25 m/minute
Die: Having four die holes

TABLE 1

| | Comparative Example 1 | Comparative Example 2 | Comparative Example 3 | Comparative Example 4 | Comparative Example 5 | Example 1 | Example 2 | Example 3 | Example 4 | Example 5 | Example 6 |
|---|---|---|---|---|---|---|---|---|---|---|---|
| Bio-polyethylene resin (A) | | | | | | | | | | | |
| Type | A-1 | A-1 | A-1 | A-1 | A-1 | A-1 | A-1 | A-1 | A-1 | A-1 | A-1 |
| (parts by weight) | 90 | 90 | 90 | 90 | 90 | 90 | 90 | 90 | 90 | 90 | 90 |
| EVOH (B) | | | | | | | | | | | |
| (parts by weight) | 10 | 10 | 10 | 10 | 10 | 10 | 10 | 10 | 10 | 10 | 10 |
| Additive component | | | | | | | | | | | |
| Amount of additive component (parts by weight) *1 | — | 5 | 5 | 5 | 5 | 5 | 5 | 5 | 5 | 5 | 5 |
| Amount of component (C) (parts by weight) *1 | — | — | — | — | — | 0.25 | 0.5 | 5 | 5 | 5 | 5 |

TABLE 1-continued

|  | Comparative Example 1 | Comparative Example 2 | Comparative Example 3 | Comparative Example 4 | Comparative Example 5 | Example 1 | Example 2 | Example 3 | Example 4 | Example 5 | Example 6 |
|---|---|---|---|---|---|---|---|---|---|---|---|
| Formulation of additive component | | | | | | | | | | | |
| Component (C) (wt. %) *2 | — | — | — | — | — | C-7 5 | C-8 10 | C-1 100 | C-1 99.5 C-7 0.5 | C-1 90 C-7 10 | C-1 60 C-7 40 |
| | — | — | — | — | — | — | — | — | — | — | — |
| | — | — | — | — | — | — | — | — | — | — | — |
| Other component (wt. %) *2 | — | α-1 100 | α-4 100 | α-5 100 | α-6 100 | α-1 95 | α-1 84 α-2 6 | — | — | — | — |

*1: Amount based on 100 parts by weight of the total of bio-polyethylene resin (A) and EVOH (B)
*2: Percentage in additive component

TABLE 2

|  | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|
| Bio-polyethylene resin (A) | | | | | | | | | | | |
| Type | A-1 | A-1 | A-1 | A-1 | A-1 | A-1 | A-1 | A-1 | A-1 | A-1 | A-1 |
| (parts by weight) | 90 | 90 | 90 | 90 | 90 | 90 | 90 | 90 | 90 | 90 | 90 |
| EVOH (B) | | | | | | | | | | | |
| (parts by weight) | 10 | 10 | 10 | 10 | 10 | 10 | 10 | 10 | 10 | 10 | 10 |
| Additive component | | | | | | | | | | | |
| Amount of additive component (parts by weight) *1 | 5 | 40 | 5 | 30 | 5 | 5 | 5 | 5 | 5 | 5 | 5 |
| Amount of component (C) (parts by weight) *1 | 5 | 40 | 5 | 28.5 | 4.75 | 5 | 5 | 5 | 5 | 5 | 5 |
| Formulation of additive component | | | | | | | | | | | |
| Component (C) (wt. %) *2 | C-1 10 C-7 90 | C-1 90 C-7 10 | C-1 95 C-8 5 | C-1 88 C-7 2 C-8 5 | C-1 88 C-7 2 C-8 5 | C-1 74 C-7 21 C-8 5 | C-2 100 | C-3 100 | C-4 100 | C-5 100 | C-6 100 |
| Other component (wt. %) *2 | — | — | — | α-2 5 | α-2 5 | — | — | — | — | — | — |

*1: Amount based on 100 parts by weight of the total of bio-polyethylene resin (A) and EVOH (B)
*2: Percentage in additive component

TABLE 3

|  | Comparative Example 6 | Example 18 | Comparative Example 7 | Example 19 | Comparative Example 8 | Example 20 | Comparative Example 9 | Example 21 |
|---|---|---|---|---|---|---|---|---|
| Bio-polyethylene resin (A) | | | | | | | | |
| Type | A-1 | A-1 | A-1 | A-1 | A-1 | A-1 | A-1 | A-1 |
| (parts by weight) | 99.9 | 99.9 | 70 | 70 | 50 | 50 | 30 | 30 |
| EVOH (B) | | | | | | | | |
| (parts by weight) | 0.1 | 0.1 | 30 | 30 | 50 | 50 | 70 | 70 |
| Additive component | | | | | | | | |
| Amount of additive component (parts by weight) *1 | — | 5 | 0 | 5 | — | 5 | — | 5 |
| Amount of component (C) (parts by weight) *1 | — | 4.75 | — | 5 | — | 5 | — | 5 |

TABLE 3-continued

|  | Comparative Example 6 | Example 18 | Comparative Example 7 | Example 19 | Comparative Example 8 | Example 20 | Comparative Example 9 | Example 21 |
|---|---|---|---|---|---|---|---|---|
| Formulation of additive component | | | | | | | | |
| Component (C) (wt. %) *2 | — | C-1<br>88<br>C-7<br>2<br>C-8<br>5 | — | C-4<br>100 | — | C-4<br>100 | — | C-5<br>100 |
| Other component (wt. %) *2 | — | α-2<br>5 | — | — | — | — | — | — |

*1: Amount based on 100 parts by weight of the total of bio-polyethylene resin (A) and EVOH (B)
*2: Percentage in additive component

TABLE 4

|  | Comparative Example 10 | Example 22 | Comparative Example 11 | Example 23 | Comparative Example 12 | Example 24 | Reference Example 1 | Reference Example 2 |
|---|---|---|---|---|---|---|---|---|
| Bio-polyethylene resin (A) | | | | | | | | |
| Type (parts by weight) | A-1<br>0.1 | A-1<br>0.1 | A-2<br>90 | A-2<br>90 | A-2<br>30 | A-2<br>30 | Petroleum PE *3<br>90 | Petroleum PE *3<br>90 |
| EVOH (B) | | | | | | | | |
| (parts by weight) | 99.9 | 99.9 | 10 | 10 | 70 | 70 | 10 | 10 |
| Additive component | | | | | | | | |
| Amount of additive component (parts by weight) *1 | — | 5 | 5 | 5 | — | 5 | — | 5 |
| Amount of component (C) (parts by weight) *1 | — | 5 | — | 4.75 | — | 5 | — | 4.75 |
| Formulation of additive component | | | | | | | | |
| Component (C) (wt. %) *2 | — | C-4<br>100 | — | C-1<br>88<br>C-7<br>2<br>C-8<br>5 | — | C-4<br>100 | — | C-1<br>88<br>C-7<br>2<br>C-8<br>5 |
| Other component (wt. %) *2 | — | — | — | α-2<br>5 | — | — | — | α-2<br>5 |

*1: Amount based on 100 parts by weight of the total of bio-polyethylene resin (A) and EVOH (B)
*2: Percentage in additive component
*3: Novatec UF240 (available from Japan Polyethylene Corporation) was used as petroleum PE.

The resin compositions of Examples 1 to 24, Comparative Examples 1 to 12, and Reference Examples 1 and 2 prepared in the aforementioned manner were evaluated for gumming amount, coloration, and bulk density under the following conditions. The evaluation results are shown in Tables 5 and 6.

[Gumming Amount]

The amount (weight) of gummy matter occurring when 5 kg of each of the resin compositions was fed into a twin-screw kneader and extruded was measured. Provided that the amounts of the gummy matter occurring when the resin compositions of Comparative examples corresponding to the base polymers ((A)+(B)) of the respective resin compositions of Examples were extruded are each taken as a base of 100, the improvement percentage of the anti-gumming property for each of Examples was calculated from the following expression:

Improvement percentage (%)=[($M_C$−$M_E$)/$M_C$]×100 wherein $M_C$ is the amount of the gummy matter for the resin composition of Comparative Example corresponding to the base polymer ((A)+(B)) of the resin composition of Example, and $M_E$ is the amount of the gummy matter for the resin composition of Example.

[Coloration Evaluation (YI)]

The YI value of a sample of each of the resin compositions prepared in the pellet form in the aforementioned manner was measured (in conformity with ASTMD1925) by means of a spectrophotometer CM-3500d available from Konica Minolta, Inc. (with a light source D65, a white calibration plate CM-A120, a petri dish set CM-A126, regular reflection measurement SCE, and a measurement diameter of 430 mm). With 5 g of the pellet sample evenly put in the petri dish, the YI value was measured and calculated. A higher YI value means that the resin composition was yellowed.

[Bulk Density]

Pellets of each of the resin compositions prepared in the aforementioned manner were sufficiently put in a container having a volume of 100 cc to be leveled without applying a pressure from above the container. Then, the weight of the pellets put in the container was determined. The apparent bulk density was calculated by dividing the determined weight by the volume. Provided that the bulk densities of the resin compositions of Comparative Examples corresponding to the base polymers ((A)+(B)) of the respective resin compositions of Examples are each taken as a base of 100, the improvement percentage of the bulk density for each of Examples was calculated from the following expression. A smaller apparent bulk density value means that the pellets have abnormalities such as so-called bulge and barb, which make it difficult to densely pack the pellets in the container.

Improvement percentage (%) = [($BD_C - BD_E$)/$BD_C$] × 100 wherein $BD_C$ is the bulk density of the resin composition of Comparative Example corresponding to the base polymer ((A)+(B)) of the resin composition of Example, and $BD_E$ is the bulk density of the resin composition of Example.

TABLE 5

| | Resin composition (parts by weight) | | | | Gumming | | Coloration | Bulk density | |
|---|---|---|---|---|---|---|---|---|---|
| | bio-polyethylene resin (A) | EVOH (B) | Component (C) | Other component | Amount (g) | Improvement percentage (%) | evaluation YI | (g/cm³) | Improvement percentage (%) |
| Comparative Example 1 | (A-1) 90 | 10 | — | — | 3.68 | — | 1 | 0.42 | — |
| Comparative Example 2 | (A-1) 90 | 10 | — | 5 | 3.31 | 10 | 1 | 0.42 | 0 |
| Comparative Example 3 | (A-1) 90 | 10 | — | 5 | 2.90 | 21 | 0 | 0.47 | 12 |
| Comparative Example 4 | (A-1) 90 | 10 | — | 5 | 3.31 | 10 | 2 | 0.43 | 2 |
| Comparative Example 5 | (A-1) 90 | 10 | — | 5 | 3.09 | 16 | 1 | 0.43 | 2 |
| Example 1 | (A-1) 90 | 10 | 0.25 | 4.75 | 2.28 | 38 | 0 | 0.42 | 0 |
| Example 2 | (A-1) 90 | 10 | 0.5 | 4.75 | 2.77 | 25 | 4 | 0.43 | 2 |
| Example 3 | (A-1) 90 | 10 | 5 | — | 0.15 | 96 | 0 | 0.43 | 2 |
| Example 4 | (A-1) 90 | 10 | 5 | — | 0.13 | 96 | 0 | 0.44 | 5 |
| Example 5 | (A-1) 90 | 10 | 5 | — | 0.09 | 98 | 0 | 0.44 | 5 |
| Example 6 | (A-1) 90 | 10 | 5 | — | 0.05 | 99 | 0 | 0.44 | 5 |
| Example 7 | (A-1) 90 | 10 | 5 | — | 0.06 | 98 | 0 | 0.45 | 7 |
| Example 8 | (A-1) 90 | 10 | 40 | — | 0.11 | 97 | 0 | 0.34 | −19 |
| Example 9 | (A-1) 90 | 10 | 5 | — | 0.08 | 98 | 1 | 0.43 | 2 |
| Example 10 | (A-1) 90 | 10 | 28.5 | 1.5 | 0.05 | 99 | 3 | 0.45 | 7 |
| Example 11 | (A-1) 90 | 10 | 4.75 | 0.25 | 0.09 | 98 | 6 | 0.46 | 10 |
| Example 12 | (A-1) 90 | 10 | 5 | — | 0.05 | 99 | 1 | 0.43 | 2 |
| Example 13 | (A-1) 90 | 10 | 5 | — | 0.61 | 84 | 2 | 0.43 | 2 |
| Example 14 | (A-1) 90 | 10 | 5 | — | 0.13 | 96 | 0 | 0.43 | 2 |

TABLE 6

| | Resin composition (parts by weight) | | | | Gumming | | Coloration | Bulk density | |
|---|---|---|---|---|---|---|---|---|---|
| | bio-polyethylene resin (A) | EVOH (B) | Component (C) | Other component | Amount (g) | Improvement percentage (%) | evaluation YI | (g/cm³) | Improvement percentage (%) |
| Example 15 | (A-1) 90 | 10 | 5 | — | 0.09 | 98 | 1 | 0.45 | 7 |
| Example 16 | (A-1) 90 | 10 | 5 | — | 1.93 | 48 | 2 | 0.42 | 0 |
| Example 17 | (A-1) 90 | 10 | 5 | — | 2.59 | 30 | 2 | 0.42 | 0 |
| Comparative Example 6 | (A-1) 99.9 | 0.1 | — | — | 0.01 | — | 0 | 0.46 | — |
| Example 18 | (A-1) 99.9 | 0.1 | 4.75 | 0.25 | 0.002 | 83 | 0 | 0.43 | −7 |
| Comparative Example 7 | (A-1) 70 | 30 | — | — | 1.12 | — | 3 | 0.46 | — |
| Example 19 | (A-1) 70 | 30 | 5 | — | 0.86 | 24 | 0 | 0.45 | −2 |
| Comparative Example 8 | (A-1) 50 | 50 | — | — | 2.13 | — | 4 | 0.49 | — |
| Example 20 | (A-1) 50 | 50 | 5 | — | 0.74 | 65 | 1 | 0.52 | 6 |
| Comparative Example 9 | (A-1) 30 | 70 | — | — | 2.29 | — | 7 | 0.59 | — |
| Example 21 | (A-1) 30 | 70 | 5 | — | 1.90 | 17 | 3 | 0.59 | 0 |
| Comparative Example 10 | (A-1) 0.1 | 99.9 | — | — | 0.17 | — | 17 | 0.70 | — |
| Example 22 | (A-1) 0.1 | 99.9 | 5 | — | 0.01 | 95 | 7 | 0.70 | 0 |

TABLE 6-continued

| | Resin composition (parts by weight) | | | | Gumming | | Coloration | Bulk density | |
|---|---|---|---|---|---|---|---|---|---|
| | bio-polyethylene resin (A) | EVOH (B) | Component (C) | Other component | Amount (g) | Improvement percentage (%) | evaluation YI | (g/cm$^3$) | Improvement percentage (%) |
| Comparative Example 11 | (A-2) 90 | 10 | — | — | 5.72 | — | 1 | 0.41 | — |
| Example 23 | (A-2) 90 | 10 | 4.75 | 0.25 | 1.28 | 78 | 6 | 0.54 | 32 |
| Comparative Example 12 | (A-2) 30 | 70 | — | — | 3.34 | — | 9 | 0.54 | — |
| Example 24 | (A-2) 30 | 70 | 5 | — | 2.68 | 20 | 2 | 0.59 | 9 |
| Reference Example 1 | (Petroleum PE *1) 90 | 10 | — | — | 2.20 | — | 1 | 0.4 | — |
| Reference Example 2 | (Petroleum PE *1) 90 | 10 | 4.75 | 0.25 | 0.10 | 95 | 2 | 0.41 | 2 |

*1: Novatec UF240 (available from Japan Polyethylene Corporation) was used as Petroleum PE.

The resin compositions of Examples each containing the bio-polyethylene (A), the EVOH (B), and a predetermined amount of the component (C) were able to suppress the gumming as compared with the corresponding resin compositions of Comparative Examples.

In Reference Examples, the ordinary petroleum-derived polyethylene was used instead of the bio-polyethylene. A comparison between Reference Example 1 and Comparative Example 1 indicates that the resin composition of Comparative Example 1 prepared by using the bio-polyethylene significantly suffered from the gumming.

Further, a comparison between Reference Example 2 and Example 11 indicates that the resin composition of Example 11 prepared by using the bio-polyethylene was able to suppress the gumming to the same level as the resin composition of Reference Example 2 prepared by using the petroleum-derived polyethylene.

While specific forms of the embodiments of the present disclosure have been shown in the aforementioned examples, the examples are merely illustrative but not limitative. It is contemplated that various modifications apparent to those skilled in the art could be made within the scope of the disclosure.

The resin composition of the present disclosure employs the bio-polyethylene, and yet can prevent the discoloration of the formed product and suppress the gumming. Therefore, a film, a sheet, and a stretched film formed from the resin composition of the present disclosure are useful for various packaging container materials.

The invention claimed is:

1. A resin composition comprising:
   (A) a bio-polyethylene resin; and
   (B) an ethylene-vinyl alcohol copolymer having an ethylene content of 20 to 60 mol %;
   wherein the resin composition further comprises, in addition to the components (A) and (B),
   (C)(i) at least one selected from the group consisting of an acid-modified ethylene-α-olefin copolymer, an ethylene-unsaturated monocarboxylic acid copolymer, an ionomer of the ethylene-unsaturated monocarboxylic acid copolymer, and an ethylene-vinyl alcohol copolymer having an ethylene content of 70 to 90 mol %, and
   (C)(ii) an ethylene-vinyl acetate copolymer.

2. The resin composition according to claim 1, wherein the total of components (C)(i) and (C)(ii) is present in a proportion of 0.1 to 30 parts by weight based on 100 parts by weight of a total of the bio-polyethylene resin (A) and the ethylene-vinyl alcohol copolymer (B) having an ethylene content of 20 to 60 mol %.

3. The resin composition according to claim 1, wherein the bio-polyethylene resin (A) and the ethylene-vinyl alcohol copolymer (B) having an ethylene content of 20 to 60 mol % are present in a weight ratio (A)/(B) of 0.1/99.9 to 99.9/0.1.

* * * * *